United States Patent [19]

Koyama

[11] Patent Number: 5,743,464

[45] Date of Patent: Apr. 28, 1998

[54] SYSTEM FOR CONTROLLING WORK TEMPERATURE BY A PROGRAMMED CONTROLLER

[75] Inventor: Isamu Koyama, Tokyo, Japan

[73] Assignee: Ohkura Electric Co., Ltr., Tokyo, Japan

[21] Appl. No.: 843,898

[22] Filed: Apr. 17, 1997

[51] Int. Cl.$^6$ .............................. F23N 5/20; G05D 15/00
[52] U.S. Cl. ...................... 236/46 R; 165/268; 236/78 B
[58] Field of Search .............................. 236/46 R, 78 B, 236/15 G, 15 BB; 165/268

[56] References Cited

U.S. PATENT DOCUMENTS

| | | | |
|---|---|---|---|
| 1,893,847 | 1/1933 | Simpson | 236/15 BB |
| 2,184,975 | 12/1939 | Mac Conville et al. | 236/78 B |
| 3,311,303 | 3/1967 | Noyes | 236/46 R |

Primary Examiner—William E. Wayner
Attorney, Agent, or Firm—Iandiorio & Teska

[57] ABSTRACT

A temperature program pattern PP for desired change of surface temperature TC1 of a work 11 with time is set by a temperature setter 31. Work temperature-difference $\Delta t_{pv}$ between the surface temperature TC1 and inside temperature TC2 of the work 11 is determined by a difference detector 34. Set value of the above temperature-difference $\Delta t_{sp}$ is given by a difference setter 35 in the form of a difference pattern DP of its change with the above surface temperature TC1. For each actual surface temperature TC1, the work temperature-difference $\Delta t_{pv}$ is compared against its set value on the difference pattern DP by a comparator 36. A slope operator 37 responds to the output from the comparator 36 and modifies slope of the temperature program pattern PP so as to cause the work temperature-difference $\Delta t_{pv}$ to follow the difference pattern DP.

4 Claims, 2 Drawing Sheets

F I G. 1
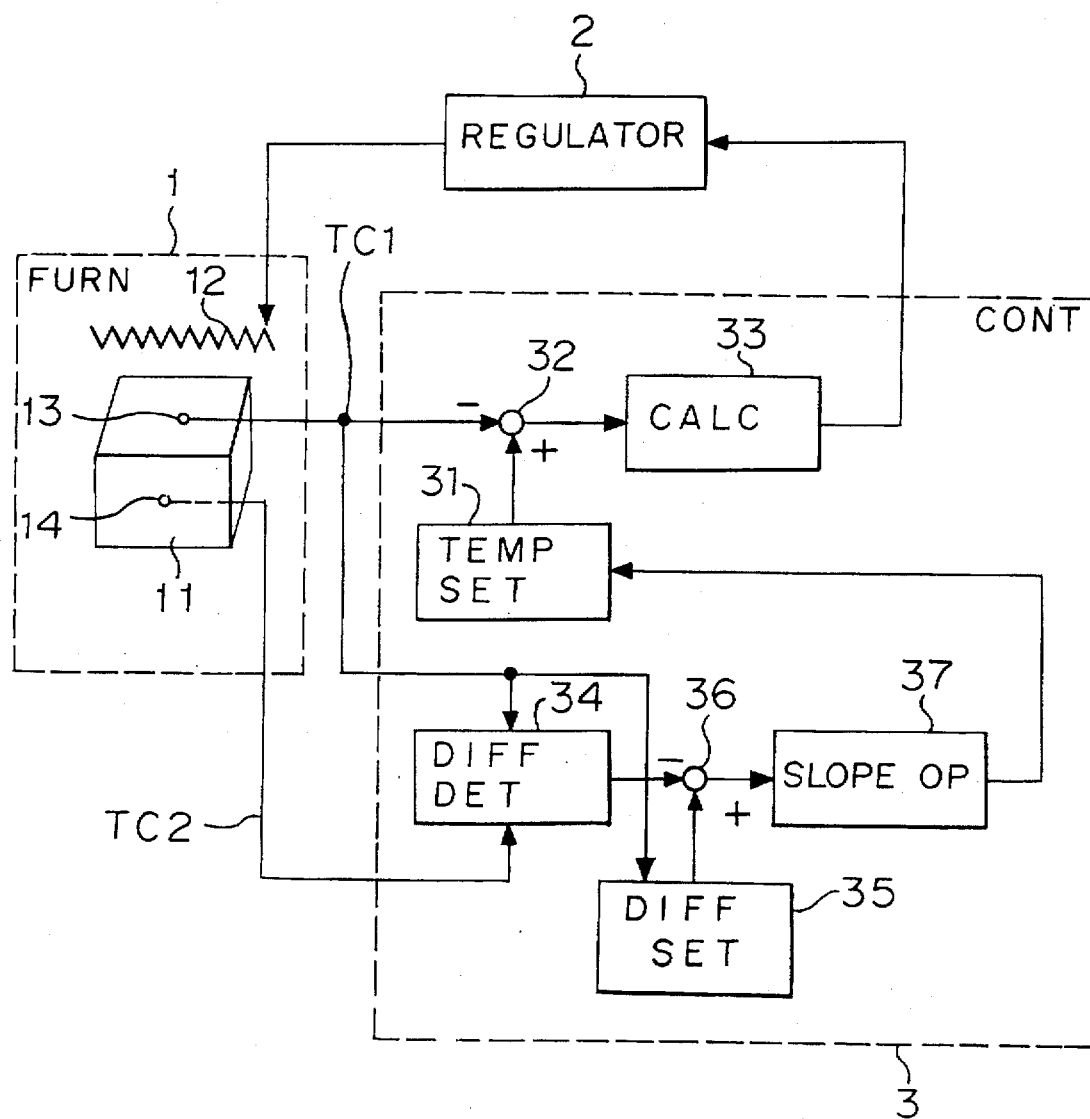

SYSTEM FOR CONTROLLING WORK TEMPERATURE BY A PROGRAMMED CONTROLLER

TECHNICAL FIELD

This invention relates to a system for controlling the temperature of a work in heat treatment thereof, more specifically during transition of either from a temperature-raising slope to a constant-temperature control or from a temperature-lowering slope to constant-temperature control. In particular, the invention relates to a system including a programmed temperature controller for controlling the work temperature, which system prevents overshoot or undershoot of the work temperature in transition from temperature-raising or -lowering slope to ensuing constant-temperature control.

BACKGROUND ART

As conventional techniques for preventing overshoot or undershoot of the temperature of a work being heat treated at the time of transition from a temperature-raising or -lowering slope into a constant temperature control, it has been a practice to insert a gentle slope of raising or lowering the temperature into the corresponding transitional portion of a temperature program pattern (preset value) for the heat treatment. The slope to be inserted has been determined in one of the following two methods, based on previous experiences. (1) A method of adding a slowly-changing temperature slope.

Transition from a linear temperature rise slope (e.g., 20° C./minute) to a constant-temperature control is likely to cause overshoot. Hence, one or more of gentle slopes (e.g., 5° C./minute to 1° C./minute) are generated just before entering the constant-temperature control, and the thus generated gentle slope(s) is(are) inserted into the preset temperature program pattern for preventing the overshoot. (2) A method of approximating a slowly-changing temperature slope by a curve.

This method is to select one from several forecast curves, and it is not possible to generate a curve of desired configuration. Hence, it has not been possible to prevent overshoot from all temperature control systems by this method.

Thus, with conventional techniques, a number of cut-and-try trials have been necessary before reaching a practicable insertion for preventing overshoot. In case of temperature control systems with a long dead time, prevention of overshoot has required much experience, and sometimes it has been impossible to prevent overshoot.

As described above, conventional techniques for preventing overshoot (undershoot) have shortcomings in that special skill and experiences are necessary in order to add suitable temperature slopes or temperature curves to transitional portions just before entering constant-temperature control in temperature program pattern, because such addition has been based on the experience of operating personnel. Besides, when cut-and-try trials are used, it takes a long time. Further, with some temperature control systems with a long dead time prevention of overshoot or undershoot has not been possible.

DISCLOSURE OF INVENTION

Therefore, an object of the present invention is to solve the above situation of the prior art and to overcome the above shortcomings thereof, by providing a novel temperature control system to be used with a programmed temperature controller, which system ensures prevention of overshoot (undershoot) of the temperature of a work being heat treated.

To fulfill the above object, a system of the invention for controlling temperature of a work in furnace through the use of a programmed temperature controller is characterized in that the system comprises a detector determining work temperature-difference between a quickly-responding surface temperature of the work and a slowly-responding inside ("inside" including most inside, the same applies hereinafter) temperature of the work; a setter giving programmable temperature-difference set values which vary with said work surface temperature; a comparator comparing the work temperature-difference against said temperature-difference set values at each quick-response temperature; and a slope operator responsive to output from said comparator for modifying a programmed slope of said controller. The set values from the above setter may be in the form of difference pattern along which said work temperature-difference is to vary, so that the work temperature-difference may be controlled in line with the difference pattern.

The inventor has disclosed in his Japanese Patent Laying-open Publication No. 095647/1996 a programmed temperature controller, in which the slope of a temperature control pattern is modified in such a manner that the difference between a quickly-responding work surface temperature and a slowly-responding work inside temperature is kept within a certain allowable range, or rate of work temperature change is kept within a corresponding certain allowable range. However, the programmed temperature controller of the above Publication had a shortcoming of being unable to prevent overshoot or undershoot of the work temperature, and research and development efforts to solve that shortcoming have resulted in the present invention.

Operative principles of the invention are as follows. When a work is heated to a preset temperature for constant temperature treatment, if there should be such a heat source which has a temperature higher than said preset temperature and is transferring heat to the work, then overshoot of the work temperature is caused. Thus, overshoot is a phenomenon in which the temperature of a work is higher than the above preset temperature. In this case, the work surface temperature is at first higher than that at the inside thereof, so that heat conducts toward the inside, and as long as the heat conducts, there is kept a temperature-difference between the surface and the inside of the work.

On the other hand, when a work is heated to a preset temperature for constant temperature treatment, if there should be such a heat source which is at a lower temperature than said preset temperature and is absorbing heat from the work, then undershoot of the work temperature is caused. Hence, undershoot is a phenomenon in which the temperature of a work is lower than the above preset temperature. In this case, the work surface temperature is at first lower than that at the inside thereof, so that heat conducts from the inside portion toward the surface, and as long as the heat conducts, there is kept a temperature-difference between the surface and the inside of the work, surface temperature being lower than that at the inside, which difference is opposite in direction to that during the overshoot. In short, when a measurable temperature-difference exists between the surface and the inside portion of a work, heat conducts from a hotter portion to a cooler portion, to cause the overshoot or undershoot.

It may be safely said that if the temperature-difference in the work is reduced to zero, then heat conduction is diminished, and the cause for overshoot or undershoot is removed. However, if the above temperature-difference is kept zero from the beginning of work heat treatment, the temperature of the work cannot be raised or lowered. Thus, with the invention, the above temperature-difference is controlled in a programmable fashion, so as to cause the difference to converge to zero at the temperature for the constant temperature control.

Based on the above principles, in addition to the input of controlled temperature in a conventional programmed temperature controller, the invention uses two other inputs; i.e., surface temperature of a work being heat treated and inside temperature thereof. The temperature-difference between the surface and inside of a work being heat treated is compared against a programmable preset value of the temperature-difference, and a slope operator responds to the result of the comparison and effects slope calculation. The slope calculation is to modify temperature program pattern (having a slope of the temperature change with time) of that conventional programmed controller which is associated with the system of the invention, so that the above-mentioned temperature-difference of a work being heat treated is brought into coincidence with a programmable preset value for the temperature-difference.

In short, the invention controls the temperature-difference of a work being heat treated so as to cause that difference converge to zero as the work temperature approaches toward a preset value for constant temperature control, said preset value being defined in temperature program pattern. Consequently, overshoot or undershoot of the temperature of the work being heat treated is prevented at the temperature for constant temperature control.

BRIEF DESCRIPTION OF DRAWINGS

For a better understanding of the invention, reference is made to the accompanying drawings, in which FIG. 1 is a block diagram showing various elements constituting a system for controlling temperature of a work according to the invention;

BEST MODE FOR CARRYING OUT THE INVENTION

Figure 2:
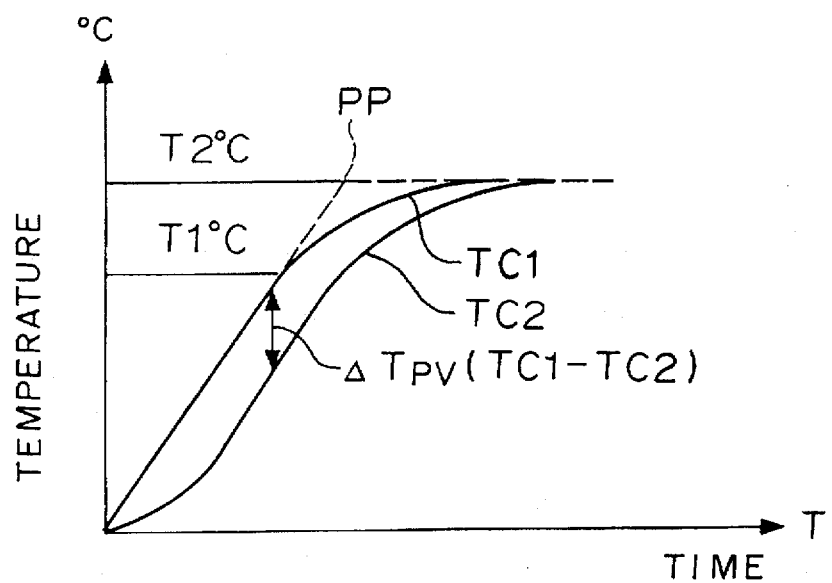
FIG. 2 is a graph showing an example of program pattern and temperature variations at different portions of a work being heat treated by a system of the invention.

Referring to FIG. 1, a system for controlling the temperature of a work according to the invention is connected to a furnace 1 for heating a work 11 which is placed therein for heat treatment. One or more heaters 12 are disposed on the furnace 1, so as to heat the work 11. A surface thermometer 13 detects quick-response temperature of the work 11 at the surface thereof, and an inside thermometer 14 detects slow-response temperature of the work 11 at the inside thereof. The output of the heaters 12 is adjusted by a power regulator 2 made of, for instance, SCRs.

Further referring to FIG. 2 along with FIG. 1, the illustrated system uses a programmed controller 3, comprising a temperature setter 31 setting a temperature program pattern PP, a comparator 32 comparing surface (quick-response) temperature TC1 of the work 11 received at a port against the program pattern PP, a control calculator 33 responsive to the output from the comparator 32, a difference detector 34 determining work temperature-difference $\Delta t_{pv}$ between the surface temperature TC1 and inside (slow-response) temperature TC2 of the work 11 received at another port, a difference setter 35 giving work temperature-difference set value $\Delta t_{sp}$, which set value varies with the surface temperature TC1 and can be predetermined in the form of a temperature-difference pattern DP in a programmable fashion, another comparator 36 comparing the temperature-difference $\Delta t_{pv}$ from the difference detector 34 against the work temperature-difference set value $\Delta t_{sp}$ from the difference setter 35, and a slope control operator 37 responsive to the output from said other comparator 36 for modifying the slope in the program pattern PP. The control calculator 33 produces control or manipulating output signal after applying computational operation, such as PID operation, on the output of the comparator 32.

Figure 3:
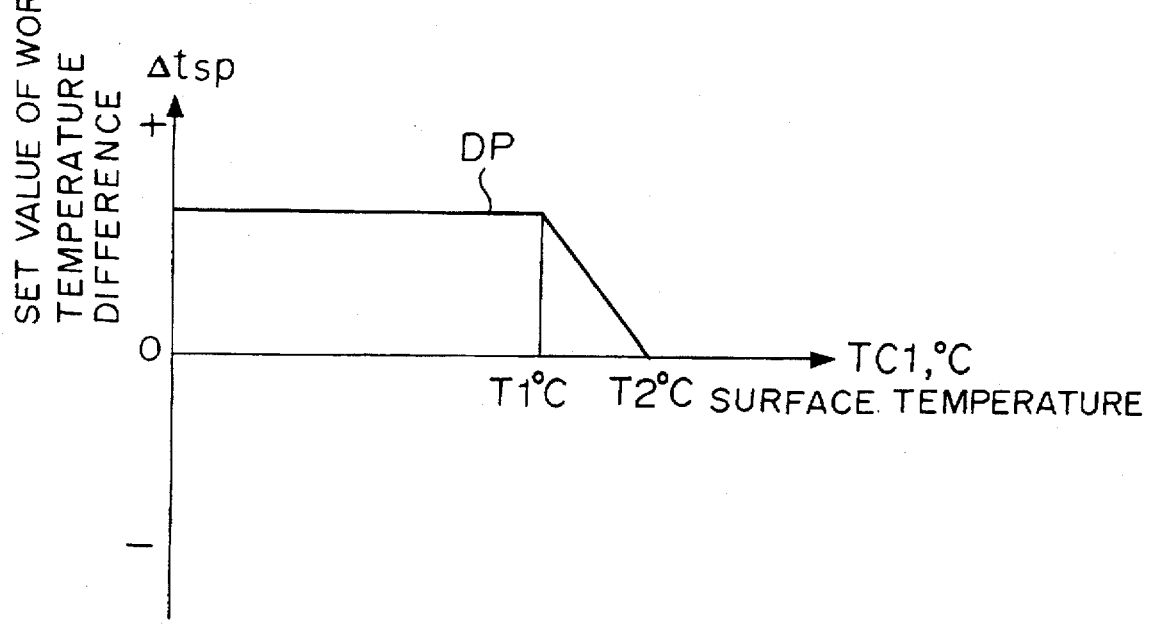
FIG. 3 is a graph showing an example of preset difference pattern for the temperature-difference between surface and inside of a work being heat treated, which pattern is used in the system of the invention.

FIGS. 2 and 3 depict temperature patterns to be used in the system of the invention. More specifically, FIG. 2 shows the manner in which the temperature of a work 11 is raised for heat treatment while controlling the work temperature-difference $\Delta t_{pv}$, and then is kept at a value for constant temperature control. In a constant value range of the temperature-difference set value $\Delta t_{sp}$, i.e., flat range of the difference pattern DP, the work temperatures TC1 and TC2 are linearly raised, and in its varying range, such as diminishing range, of the difference pattern DP, the work temperatures vary along arcuate curves.

It is noted in FIG. 1 that the controlled temperature of the controller 3, such as the inside atmospheric temperature of the furnace 1, is assumed to be the same as the surface temperature TC1 of the work 11. Also assumed is that the work surface temperature TC1 is controlled by the heaters 12 or burners (combustion furnace, not shown) so as to coincide with the program pattern PP. In FIG. 3, a setting-switch temperature T1° C. and a preselected temperature T2° C. for constant temperature control are indicated on the abscissa of surface temperature TC1. The slope control operator 37 keeps the slope of the program pattern PP (FIG. 2) at a constant value corresponding to the flat portion of the difference pattern DP of the temperature-difference set value $\Delta t_{sp}$ (FIG. 3). When the work surface reaches the setting-switch temperature T1° C., the difference pattern DP switches to the declining portion of FIG. 3. Thereby, the slope of actual work surface temperature TC1 is continuously changed by the slope operator 37, so that the locus of the work surface temperature TC1 gradually curves as shown by the solid line in FIG. 1 until it reaches the preselected constant temperature T2° C.

The work temperature-difference set value $\Delta t_{sp}$ of FIG. 3 is pre-programmed in the form of a difference pattern DP for different values of the work surface temperature TC1 and for a preselected temperature T2° C. for constant temperature control. The abscissa (temperature axis) of FIG. 3 corresponds to the ordinate (temperature axis) of FIG. 2.

The operation of the system of the invention will now be described by referring to FIGS. 1 to 3. As information of the work 11 being heat treated, its quick-response (surface) temperature TC1 and slow-response (inside) temperature TC2 are measured by the thermometers 13 and 14, and applied to the difference detector 34 for determining the work temperature-difference $\Delta t_{pv}$. The difference setter 35 sets work temperature-difference set value $\Delta t_{sp}$ as shown in the programmable difference pattern DP of FIG. 3. The work temperature-difference $\Delta t_{pv}$ from the difference detector 34 is compared with the difference pattern DP from the difference setter 35 by the comparator 36, and the slope control operator 37 responds to the output from the comparator 36. The slope operator 37 effects calculation so as to modify the slope in the temperature program pattern PP from temperature setter 31. The slope modification by the operator 37 is such that the work temperature-difference $\Delta t_{pv}$ is brought into coincidence with the temperature-difference set value $\Delta t_{sp}$ of the difference pattern DP.

When the surface temperature TC1 of the work 11 reaches the setting-switch temperature T1° C. of FIGS. 2 and 3, the temperature-difference set value $\Delta t_{sp}$ linearly diminishes in the region between the setting-switch temperature T1° C. and the preset value T2° C. for constant temperature treatment where the work temperature difference $\Delta t_{pv}$ becomes nil, as shown by the Difference pattern DP. Thus, for a range below the setting-switch temperature T1° C., the temperature of the work 11 increases with a constant value of the work temperature-difference $\Delta t_{pv}$ as shown by the flat portion of the difference pattern DP of FIG. 3. As the work surface temperature TC1 further increases, the work temperature-difference $\Delta t_{pv}$ linearly diminishes and reaches zero at the above present value T2° C. for constant temperature treatment.

Referring to FIG. 2, the illustrated variation of the work temperature-difference $\Delta t_{pv}$ for the work surface temperature TC1 in a range between the setting-switch temperature T1° C. and the preset value T2° C. for constant temperature treatment represents the result of the continuous modification of the slope in the temperature program pattern PP toward gentle slope. The result of the above continuous modification of the slope is also represented by the locus of the change of the work surface temperature TC1.

If one considers the temperature-difference $\Delta t_{pv}$ (=TC1−TC2) of the work 11 as a cause of heat movement (conduction) therein, when the temperature-difference $\Delta t_{pv}$ assumes a positive value, the inside temperature increases; when the former assumes a negative value, the latter decreases; and when the former is zero, then the latter remains unchanged. If this consideration of the cause of heat conduction in the work 11 is applied to temperature programmed control of heat treatment, it becomes possible to eliminate overshoot (undershoot) by controlling the temperature-difference $\Delta t_{pv}$ so as to diminish it to zero at the work surface temperature value T2° C. for the constant temperature treatment.

In the above description referring to FIGS. 2 and 3, a shift from temperature raise to constant temperature control has been dealt with. It should be understood that similar modification of slope can applied for shift from temperature decrease to constant temperature control.

The inside thermometer 14 is assumed to remain at an inside portion of the work 11 during heat treatment in the above embodiment. If it is not desirable or impossible to measure the work inside temperature TC2 continuously throughout the heat treatment, a trial heat treatment may be run by using a dummy work having the same heat conduction characteristics as that of the actual work 11 to be heat treated. Necessary slope modification information relating to the modifying of the temperature program pattern PP may be obtained by the trial heat treatment and recorded. Then, the same heat control with the same slope modification information can be run repeatedly without overshoot (undershoot) for treating the actual works 11 without mounting the inside thermometer 14 thereon.

With the difference pattern DP of FIG. 3, a constant temperature-difference set value $\Delta t_{sp}$ is used over that range of work surface temperature TC1 which is below the setting-switch temperature T1° C. The process for heating up to the setting-switch temperature T1° C. is not limited to that with the above constant temperature-difference, and in fact any suitable temperature variation can be used in that range.

Industrial Applicability

As described in detail in the foregoing, with the system of the invention for controlling work temperature according to the invention, overshoot and undershoot in the temperature of a work being heat treated can be effectively prevented, and it has become unnecessary to prepare temperature program pattern with gentle slope for ensuring the quality of work. Further, an outstanding effect of proceeding into constant temperature treatment at a highest speed, which is allowable for the quality of each work to be treated, can be achieved. As a result, the speed of heat treatment is increased and the time necessary for heat treatment is reduced.

Furthermore, with the control system of the invention, the temperature of the system is controlled through feedback with minimum loss of power, and energy consumption for heat treatment of work can be minimized.

I claim:

1. A system for controlling temperature of a work in furnace, comprising a controller controlling furnace temperature along at least a slope of temperature change with time; a port receiving quick-response temperature at a quickly-responding portion of the work; another port receiving slow-response temperature at a slowly-responding portion of the work; a detector determining work temperature-difference between said quick-response and slow-response temperatures; a setter setting a difference pattern along which said work temperature-difference is to vary with said quick-response temperature; a comparator comparing the work temperature-difference against said difference pattern at each received quick-response temperature; and a slope operator responsive to output from said comparator for modifying said slope so as to control the work temperature-difference in line with the difference pattern.

2. A system as set forth in claim 1, wherein said controller keeps said furnace temperature at a constant level for a period of time, and said difference pattern diminishes to zero at that quick-response temperature which is the same as said constant level.

3. A system as set forth in claim 2, wherein said slope operator modifies the slope in response to output from said comparator so as to prevent temperature change of the work from overshoot and undershoot.

4. A system as set forth in claim 1, wherein said slope operator modifies the slope in response to output from said comparator so as to prevent temperature change of the work from overshoot and undershoot.

* * * * *